United States Patent
Askan et al.

(10) Patent No.: US 12,548,995 B2
(45) Date of Patent: Feb. 10, 2026

(54) LOW-VOLTAGE PROTECTIVE DEVICE

(71) Applicant: Eaton Intelligent Power Limited, Dublin (IE)

(72) Inventors: Kenan Askan, Vienna (AT); Peter Schasfoort, Oldenzaal (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 171 days.

(21) Appl. No.: 18/689,628

(22) PCT Filed: Sep. 14, 2022

(86) PCT No.: PCT/EP2022/025430
§ 371 (c)(1),
(2) Date: Mar. 6, 2024

(87) PCT Pub. No.: WO2023/041196
PCT Pub. Date: Mar. 23, 2023

(65) Prior Publication Data
US 2025/0007274 A1    Jan. 2, 2025

(30) Foreign Application Priority Data
Sep. 20, 2021  (GB) .................................... 2113411

(51) Int. Cl.
*H02H 3/24* (2006.01)
*H02H 1/00* (2006.01)

(52) U.S. Cl.
CPC ............ *H02H 3/24* (2013.01); *H02H 1/0007* (2013.01)

(58) Field of Classification Search
CPC ...... G01R 31/327; H01H 9/541; H01H 9/542; H01H 2009/543; H01H 2009/544; H01H 2009/546; H02H 1/0007; H02H 3/24
(Continued)

(56) References Cited

U.S. PATENT DOCUMENTS 4,432,029 A * 2/1984 Lundqvist ................ H02H 7/16
361/57
2016/0161547 A1 * 6/2016 Farquhar, III ......... G01K 13/00
324/549
(Continued)

FOREIGN PATENT DOCUMENTS

CN       212 572 059 U     2/2021
GB         2 521 188 A     6/2015
(Continued)

OTHER PUBLICATIONS

Machine translation of Ahn Korean Patent Document KR 10-2014-0017773 A Feb. 2014 (Year: 2014).*

Primary Examiner — Kevin J Comber
(74) Attorney, Agent, or Firm — LEYDIG, VOIT & MAYER, LTD.

(57) ABSTRACT

For a low-voltage protective device, comprising: at least a first outer conductor path with a bypass switch, a first semiconductor circuit arrangement connected in parallel to the mechanical bypass switch, the first semiconductor circuit arrangement comprising at least one power semiconductor, at least a first voltage-dependent resistor is arranged in parallel with the bypass switch and the first semiconductor circuit arrangement, a control and driver unit configured to drive the first semiconductor circuit arrangement with a control voltage, it is suggested, that the low-voltage protective device comprises a voltage-detection-arrangement for detecting a voltage drop at the first voltage-dependent resistor and/or at least one temperature-detection-device to measure the temperature of the first voltage-dependent resistor at least before a switch on of the low-voltage protective device.

17 Claims, 2 Drawing Sheets

Figure 1:
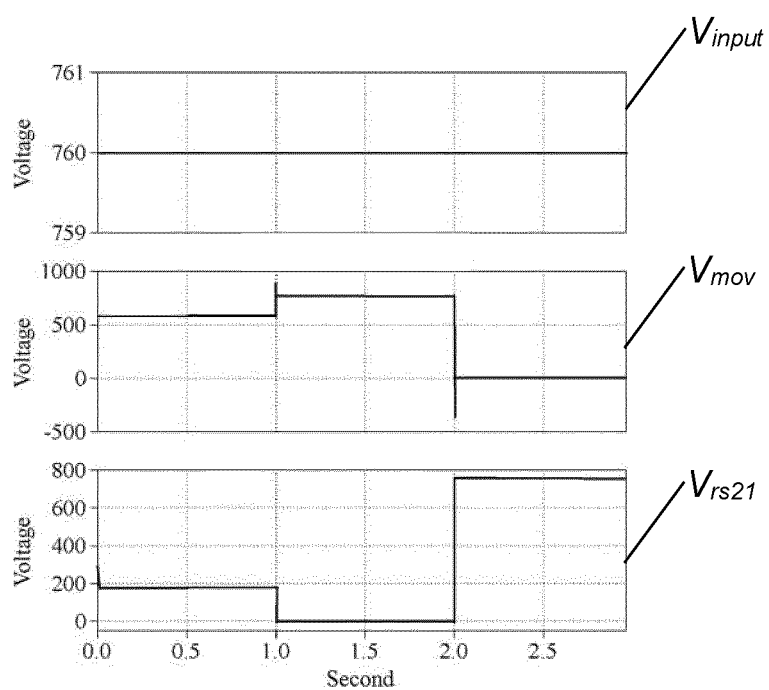

(58) Field of Classification Search
USPC .......................................................... 361/92
See application file for complete search history.

(56) References Cited

U.S. PATENT DOCUMENTS

2016/0314928 A1* 10/2016 Niehoff .................... H02H 3/08
2020/0185904 A1 6/2020 Askan

FOREIGN PATENT DOCUMENTS

KR 20140017773 A * 2/2014 ............. H02H 9/005
WO 2015/028634 A1 3/2015

* cited by examiner

LOW-VOLTAGE PROTECTIVE DEVICE

The present disclosure relates to a low-voltage protective device according to the generic part of claim 1.

The WO 2015/028634 A1 shows a Hybrid Circuit Breaker (HCB), also known as a circuit breaker with a hybrid switch, comprising a varistor. The circuit breaker comprises a first galvanic separation switch and a bypass switch in the live line as well as a second galvanic separation switch in the neutral line and a semiconductor switch element connected parallel to the bypass switch. Further, a processing unit controls the first and second galvanic separation switches.

It has been shown that varistors, particularly Metal-Oxide-Varistors, are important in reality. Therefore, a strong need exists to protect varistors in Hybrid Circuit Breakers to ensure their functionality. If a varistor malfunctions the switching off of a high current might destroy the low-voltage protective device and parts of the protected electric grid.

It is conventionally known, that especially Metal-Oxide-Varistors (MOVs) which are used in hybrid and solid-state circuit breakers might age and therefore malfunction. Metal Oxide Varistors are subject to impulse currents during interruption of fault current events where energy is stored in the line and stray inductances shall be dissipated as heat on them. Depending on the amount of the fault events, Metal Oxide Varistors will underlie ageing and maybe also breakdown.

The aforementioned apparatus has the disadvantage, that the varistor is not protected and therefore the functionality of the low-voltage protective device is not guaranteed.

It is an object of the present invention to overcome the drawbacks of the state of the art by providing a low-voltage protective device with which a safe functionality is achieved.

According to the invention, the aforementioned object is solved by the features of claim 1.

As a result, the low-voltage protective device respective a Hybrid Circuit Breaker fulfils the object and has the advantages, that it can—in case of a short circuit or another high current fault—be switched off without damaging itself or the grid. Parts of the functionality of the low-voltage protective device can be detected during the low-voltage protective device is electrically switched off and before switching it electrically on and connecting the load connections with the power supply connections. This means that just parts of the low-voltage protective device are activated to measure voltage and/or temperature during the first outer conductor path is still open and switched off and no electric current reaches a load connected to the first outer conductor path.

With the voltage-detection-arrangement a voltage drop at the first voltage-dependent resistor can be detected at least before starting a switch on of the low-voltage protective device. With the temperature-detection-device the temperature, especially a temperature falls or rise, of the first voltage-dependent resistor can be measured. Therefore, a voltage drop and/or a temperature can be safely detected and the health of said resistor can be monitored. Apart from the ageing detection of the resistor, it can also be understood whether varistors are in the circuit or not. For example, whether a varistor is still connected or it is disconnected, or the varistor is still acting as varistor.

The dependent claims describe further preferred embodiments of the invention.

The invention is described with reference to the drawings. The drawings show only exemplary embodiments of the invention.

Figure 2:
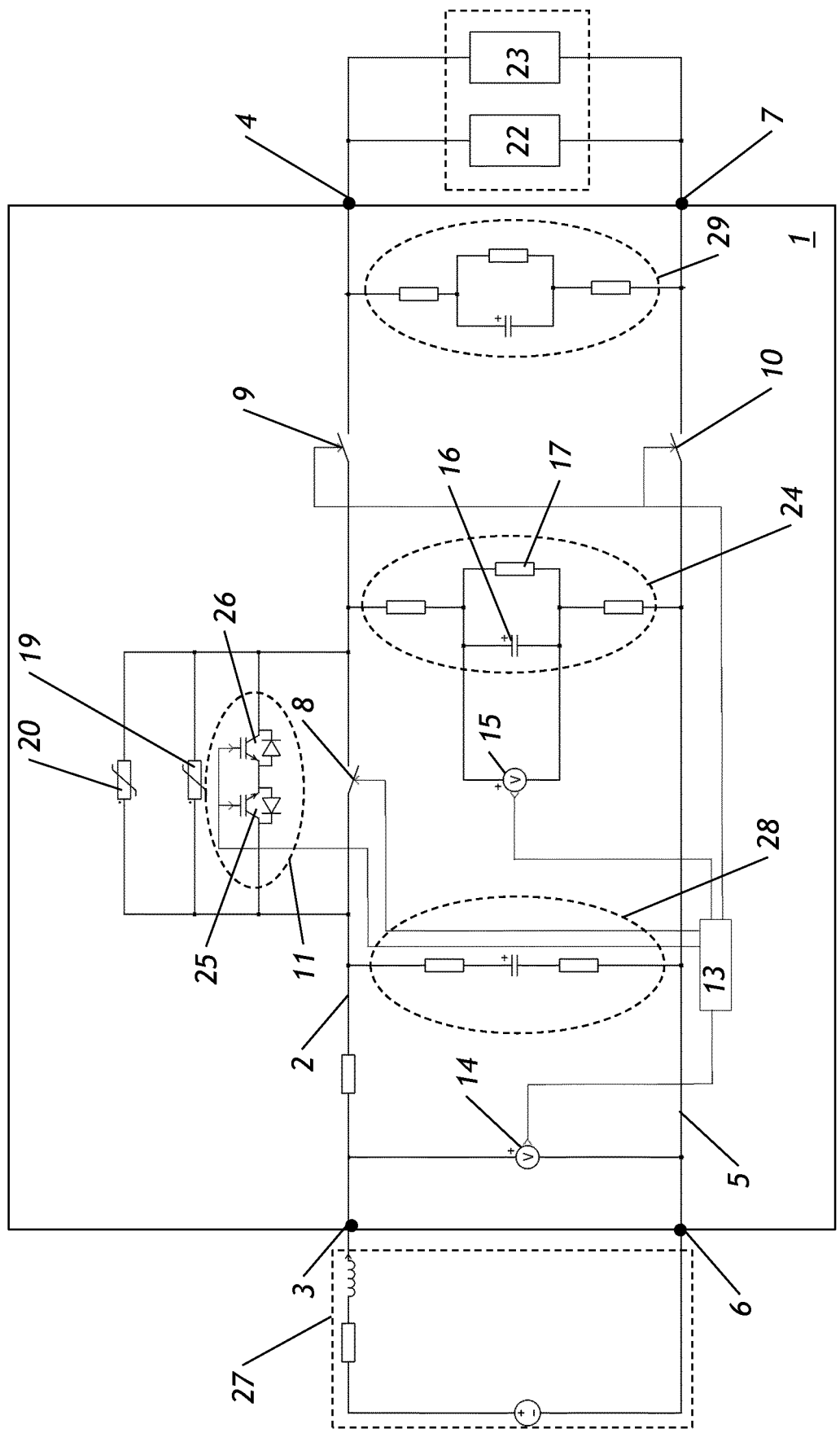

FIG. 1. shows a graph of the source voltage as well as different voltage drops;

FIG. 2 illustrates a preferred embodiment of a low-voltage protective device in a schematic view.

FIG. 2 illustrates at least a part of a preferred embodiment of a low-voltage protective device 1, comprising:

at least a first outer conductor path 2 from an outer conductor power supply connection 3 of the low-voltage protective device 1 to an outer conductor load connection 4 of the low-voltage protective device 1, a neutral conductor path 5 from a neutral conductor connection 6 of the low-voltage protective device 1 connected to a neutral conductor load connection 7 of the low-voltage protective device 1, a mechanical bypass switch 8 arranged in the first outer conductor path 2, a first semiconductor circuit arrangement 11 of the low-voltage protective device 1 connected in parallel to the mechanical bypass switch 8, the first semiconductor circuit arrangement 11 comprising at least one power semiconductor, at least a first voltage-dependent resistor 19, in particular a varistor, is arranged in parallel with the bypass switch 8 and the first semiconductor circuit arrangement 11, a control and driver unit 13 configured to drive the first semiconductor circuit arrangement 11 with a control voltage, whereby the low-voltage protective device 1 comprises a voltage-detection-arrangement for detecting a voltage drop at the first voltage-dependent resistor 19 and/or at least one temperature-detection-device to measure the temperature of the first voltage-dependent resistor 19 at least before a switch on of the low-voltage protective device 1.

The switch on process of the low-voltage protective device 1 is carried out based on the detected voltage drop at the first voltage-dependent resistor 19 and the measured temperature of the first voltage-dependent resistor 19.

As a result, the low-voltage protective device 1 respective a Hybrid Circuit Breaker fulfils the object and has the advantages, that it can—in case of a short circuit or another high current fault—be switched off without damaging itself or the grid. Parts of the functionality of the low-voltage protective device 1 can be detected during the low-voltage protective device 1 is electrically switched off and before switching it electrically on and connecting the load connections 4, 7 with the power supply connections 3, 6. This means that just parts of the low-voltage protective device 1 are activated to measure voltage and/or temperature during the first outer conductor path 2, and especially also the neutral conductor path 5, is still open and switched off and no electric current reaches a load 22, 23 connected to the first outer conductor path 1.

With the voltage-detection-arrangement a voltage drop at the first voltage-dependent resistor can be detected at least before starting a switch on of the low-voltage protective device. With the temperature-detection-device the temperature, especially a temperature falls or rise, of the first voltage-dependent resistor can be measured. Therefore, a voltage drop and/or a temperature can be safely detected and the health of said resistor can be monitored. Apart from the ageing detection of the resistor, it can also be understood whether varistors are in the circuit or not. For example, whether a varistor is still connected or it is disconnected, or the varistor is still acting as varistor.

Preferably, the low-voltage protective device 1 can be a low-voltage circuit breaker, particularly a Hybrid Circuit Breaker, with a not shown housing.

The low-voltage protective device 1, comprises at least a first outer conductor path 2 as connection from an outer conductor power supply connection 3 to an outer conductor load connection 4. A neutral conductor path 5 is from a neutral conductor connection 6 to a neutral conductor load connection 7. The first outer conductor path 2 further comprises a first galvanic disconnection switch 9, and the neutral conductor path 5 further comprises a second galvanic disconnector 10.

It can also be preferred, that a galvanic disconnector 9 is arranged between the first semiconductor circuit arrangement 11 and the outer conductor load connection 4. It can be preferred, that the galvanic disconnector 9 is embodied as a mechanical disconnector. Further, a second galvanic disconnector 10 is part of the neutral conductor path 5.

The low-voltage protective device 1 comprises a hybrid breaking arrangement. This hybrid breaking arrangement comprises a bypass switch 8 arranged in the first outer conductor path 2. The bypass switch 8 is a mechanical switch, particularly a relay. A first semiconductor circuit arrangement 11 is connected in parallel to the mechanical bypass switch 8. The first semiconductor circuit arrangement 11 comprises at least one or a first power semiconductor 25. Especially the first semiconductor circuit arrangement 11 also comprises a second power semiconductor 26, which is arranged opposite to the first power semiconductor 25. Preferably, the first and the second power semiconductor are each an IGBT.

At least a first voltage-dependent resistor 19, in particular a varistor or a Metal-Oxide-Varistor, is arranged in parallel with or to the bypass switch 8 and the first semiconductor circuit arrangement 11. Preferably, the low-voltage protective device 1 also comprises a second voltage-dependent resistor 20.

A parallel connection of the bypass switch 8 and the first semiconductor circuit arrangement 11 and the at least first voltage-dependent resistor 19 is also known as HMP (Hybrid Power Module).

Further, the low-voltage protective device 1 comprises a control and driver unit 13 configured to drive the first semiconductor circuit arrangement 11 and the switches with a control voltage.

The functionality of those basic parts, however comprising a first semiconductor circuit arrangement 11 with different details, is described in the WO 2015/028634 A1.

FIG. 2 further shows a power grid 27, and connected load parts 22, 23.

The low-voltage protective device 1 comprises a voltage-detection-arrangement and/or at least one temperature-detection-device. The voltage-detection-arrangement is intended for detecting a voltage drop at the first voltage-dependent resistor 19 at least before a switch on, respectively a switching on process, of the low-voltage protective device 1. The temperature-detection-device is intended to measure the temperature of the first voltage-dependent resistor 19 at least before a switch on, respectively a switching on process, of the low-voltage protective device 1.

Preferably the term "switch on" denotes the electrical connection of the conductor load connections 4, 7 with the power grid 27, whereby preferably a voltage is applied at the conductor load connections 4, 7. Preferably the term "switch off" denotes the electric disconnection of the conductor load connections 4, 7 to the power grid 27, whereby preferably the conductor load connections 4, 7 are essentially voltage free. Even though the conductor load connections 4, 7 are disconnected to the power grid 27, parts of the low-voltage protective device 1 could be active. The actual invention operates with active parts of the low-voltage protective device 1 in case the low-voltage protective device 1 is still switched off respectively before the low-voltage protective device 1 is switched on.

For the measurement or the detection of the voltage drop and/or the temperature of the first voltage-dependent resistor 19 the galvanic disconnectors 9, 10 can be closed, respectively switched on, or opened, respectively switched off. Especially during a voltage measurement, the bypass switch 8, the galvanic disconnectors 9, 10, the IGBTs 25, 26 can be switched off, especially they are switched off, to detect a derating of the voltage-dependent resistor 19. However, the low-voltage protective device 1 is still switched off even with some closed parts, especially which closed galvanic disconnectors 9, 10.

The voltage-detection-arrangement could be embodied in different ways. Tests have shown that a voltage meter arranged parallel to the first voltage-dependent resistor 19 would be very difficult to install and it would be part of a potential fault.

According to a preferred embodiment, the voltage-detection-arrangement comprises a first voltage measuring device 14 for measuring the voltage between the first outer conductor path 2 and the neutral conductor path 5. The first voltage measuring device 14 is arranged on the first outer conductor path 2 between the outer conductor power supply connection 3 and the bypass switch 8. Preferably the first voltage measuring device 14 is connected to the outer conductor power supply connection 3. Preferably the first voltage measuring device 14 is connected to the neutral conductor connection 6 of the neutral conductor path 5. The first voltage measuring device 14 measures the voltage $V_{input}$ of the electric current incoming to the low-voltage protective device 1. This voltage $V_{input}$ is the voltage in front of the first semiconductor circuit arrangement 11.

It is further preferred, that the voltage-detection-arrangement comprises a second voltage measuring device 15, whereby the second voltage measuring device 15 is arranged between the bypass switch 8 and the outer conductor load connection 4. The second voltage measuring device 15 measures a voltage after the first semiconductor circuit arrangement 11.

Preferably, the low-voltage protective device 1 comprises at least a first snubber arrangement 24, and that one connection of the first snubber arrangement 24 is arranged between the bypass switch 8 and the outer conductor load connection 4, especially between the bypass switch 8 and the first galvanic disconnector 9. Another connection of the first snubber arrangement 24 is arranged at the neutral conductor path 5 between the second galvanic disconnector 10 and the neutral conductor connection 6.

Preferably, the first snubber arrangement 24 has at least a capacitor 16 and at least a resistor 17.

Preferably and as shown in FIG. 2 the low-voltage protective device 1 further comprises a second snubber arrangement 28 and/or a third snubber arrangement 29 from the first outer conductor path 2 to the neutral conductor path 5. The second snubber arrangement 28 is arranged near the input area of the low-voltage protective device 1, respectively near the outer conductor power supply connection 3 and the neutral conductor connection 6. The third snubber arrangement 29 is arranged near the output area of the low-voltage protective device 1, respectively near the outer conductor load connection 4 and the neutral load connection 7.

The functionality of a snubber arrangement 24, 28, 29 is principally known. Preferably the first snubber arrangement 24 and/or the second snubber arrangement 28 and/or the third snubber arrangement 29 is a RC-snubber, as also shown in FIG. 2, for noise mitigation.

The second voltage measuring device 15 can be preferably arranged at the first snubber arrangement 24. Preferably the second voltage measuring device 15 is connected in parallel to the capacitor 16. This means that the second voltage measuring device 15 measures the voltage drops at the capacitor 16. FIG. 2 shows a resistor 17 that is arranged parallel to the capacitor 16. According to Kirchhoff's circuit laws the measured voltage drops at the parallel arranged capacitor 16 and the resistor 17 are identical. The voltage drops measured by the second voltage measuring device 15 at or in the snubber arrangement 24 is $V_{rs21}$.

Preferably, the voltage-detection-arrangement is embodied to detect the voltage drop at the first voltage-dependent resistor 19 by subtracting a second voltage measured by the second voltage measuring device 15 from a first voltage measured by the first voltage measuring device 14. Therefore, $$V_{mov} = V_{input} - V_{rs21}$$

whereby $V_{mov}$ is the voltage drop at the voltage-dependent resistor 19. $V_{input}$ and $V_{rs21}$ are already described. FIG. 1 exemplarily shows these voltages.

Further, it can be preferred, that the first voltage measuring device 14 and the second voltage measuring device 15 are connected to the control and driver unit 13, which can be exemplarily seen in FIG. 2, and that especially the subtraction of the second voltage from the first voltage is carried out by the control and driver unit 13.

It can also be preferred, that the control and driver unit 13 is embodied to compare the temporal course of the voltage drop with at least one stored behavior of the voltage drop.

It can be preferred, that the control and driver unit 13 may also compare single values of the voltage drop, especially $V_{mov}$, with single values of the stored behavior.

It can also be preferred, that the control and driver unit 13 may compare multiple values of the voltage drop with multiple values of the stored behavior.

The stored behavior might comprise a range of specific values.

Preferably, the switch on process is carried out if and only if the temporal course of the voltage drop fits within the expected values, particularly within the expected range, of the stored behavior.

It can further be preferred, that the switch on process of the low-voltage protective device 1 is stopped if the temporal course of the voltage drop does not fit within the expected values, particularly within the expected range, of the stored behavior. Therefore, if $V_{mov}$ does not lie within said expected range, the circuit detects ageing and prevents the Hybrid Circuit Breaker to be switched on.

During short circuit current interruptions almost all parts of the low-voltage protective device 1 are subject to pulse currents. At switch off the first power semiconductor 25 and the second power semiconductor 26, the fault current commutates to the first voltage-dependent resistor 19 due to its non-linear resistor characteristics.

Most of the energy stored in the current limiting choke and stray inductances will be dissipated by the first voltage-dependent resistor 19 as heat. Additional to the voltage-detection-arrangement or together with the voltage-detection-arrangement, the low-voltage protective device 1 comprises at least one temperature-detection-device to measure the temperature of the first voltage-dependent resistor 19. Therefore, the temperature of at least the first voltage-dependent resistor 19 is measured before switching on the low-voltage protective device 1. As described before, the first and the second galvanic disconnectors 9, 10 typically are closed during the measuring parts. However, the low-voltage protective device 1 is still switched off even with closed galvanic disconnectors 9, 10.

FIG. 1 shows possible details of the different voltages and outer parts.

Further, details of a preferred embodiment of the low-voltage protective device 1 are described.

The source voltage respective $V_{input}$ may be 760 V. The voltage drop on the first voltage-dependent resistor 19 respective $V_{mov}$ is in this example around 585 V, which can be exemplarily seen in FIG. 1. The voltage drops at the snubber 24 respective $V_{rs21}$ could be also seen in FIG. 1. The maximum leakage current will be maximum 76 µA.

Bevor starting the switching on operation, first, the—open—galvanic disconnectors 9, 10 are closed. The closing time is around 40 ms to reach a mechanically stable contact position.

Preferably, the Hybrid Power Module is first switched on after 1 second delay. The reason behind the delay is the time required to recharge the—not shown—buffer capacitor of the relay driver for the galvanic disconnectors 9, 10.

Therefore, during the switching on operation, the first voltage-dependent resistor 19 is for example under a source voltage of maximal 760 V during a time of 1 second. A selected single Metal-Oxide-Varistor as first voltage-dependent resistor 19 can hold up a DC voltage up to 750 V with a maximum leakage current of 1 mA at 25° C. case temperature. At 85° C. case temperature, the maximum holding voltage would be 615 V with maximum 1 mA leakage current. According to this simulation, at 25° C. ambient temperature the leakage current is around about 5 mA during 1 second time. This results in 3.8 Joule energy for 1 second time.

In the example, the low-voltage protective device 1 would be sized to operate at 100 A nominal current in maximum ambient temperature of 50° C. Previously realized thermal measurement results show that the case temperature of the first voltage-dependent resistor 19 in form of a Metal-Oxide-Varistors reach to maximum 75° C. at 50° C. ambient temperature and 100 A nominal current, which complies with a 25 K temperature rise in a steady-state. This test shows a leakage current flowing and the temperature rising in a single Metal-Oxide-Varistor during 1 second time at 75° C. at 760 V.

As described the temperature behaviour of the first voltage-dependent resistor 19 could show whether the first voltage-dependent resistor 19 would operate in the required manner to operate the low-voltage protective device 1. Therefore, it is preferred, that the switch on process of the low-voltage protective device 1 is carried out if and only if the measured temperature of the first voltage-dependent resistor 19 is lower than a predefined temperature value. Further, it is preferred, that the switch on process of the low-voltage protective device 1 is stopped or does not begin if the measured temperature of the first voltage-dependent resistor 19 is higher than a predefined temperature value.

While the present invention has been particularly shown and described with reference to exemplary embodiments thereof, it will be understood by those skilled in the art that various changes in form and details may be made therein without departing from the spirit and scope of the present invention as defined by the appended claims. The exemplary embodiments should be considered as descriptive only and not for purposes of limitation. Therefore, the scope of the present invention is not defined by the detailed description but by the appended claims.

Hereinafter are principles for understanding and interpreting the actual disclosure.

Features are usually introduced with an indefinite article "one, a, an". Unless otherwise stated in the context, therefore, "one, a, an" is not to be understood as a numeral.

The conjunction "or" has to be interpreted as inclusive and not as exclusive, unless the context dictates otherwise. "A or B" also includes "A and B", where "A" and "B" represent random features.

By means of an ordering number word, for example "first", "second" or "third", in particular a feature X or an object Y is distinguished in several embodiments, unless otherwise defined by the disclosure of the invention. In particular, a feature X or object Y with an ordering number word in a claim does not mean that an embodiment of the invention covered by this claim must have a further feature X or another object Y.

An "essentially" in conjunction with a numerical value includes a tolerance of ±10% around the given numerical value, unless the context dictates otherwise.

For ranges of values, the endpoints are included, unless the context dictates otherwise.

The invention claimed is:

1. A protective device comprising:
   at least a first outer conductor path from an outer conductor power supply connection of the protective device to an outer conductor load connection of the protective device;
   a neutral conductor path from a neutral conductor connection of the protective device connected to a neutral conductor load connection of the protective device,
   a mechanical bypass switch arranged in the first outer conductor path;
   a first semiconductor circuit arrangement of the protective device connected in parallel to the mechanical bypass switch, the first semiconductor circuit arrangement comprising at least one power semiconductor;
   at least a first voltage-dependent resistor is arranged in parallel with the bypass switch and the first semiconductor circuit arrangement;
   a control and driver unit configured to drive the first semiconductor circuit arrangement with a control voltage;
   a voltage-detection-arrangement configured to detect a voltage drop at the first voltage-dependent resistor; and
   at least one temperature-detection-device configured to measure a temperature of the first voltage-dependent-resistor at least before a switch on of the protective device,
   wherein the switch on of the protective device is configured to be carried out based on the voltage drop at the first voltage-dependent resistor and the measured temperature of the first voltage-dependent resistor.

2. The low voltage-protective device according to according to claim 1, wherein the voltage-detection-arrangement comprises a first voltage measuring device configured to measure a voltage between the first outer conductor path and the neutral conductor path, the first voltage measuring device being arranged between the outer conductor power supply connection and the mechanical bypass switch.

3. The protective device according to claim 2, wherein the voltage-detection-arrangement further comprises a second voltage measuring device, and wherein the second voltage measuring device is arranged between the mechanical bypass switch and the outer conductor load connection.

4. The protective device according to claim 3, wherein a first galvanic disconnector is arranged in the first outer conductor path between the first semiconductor circuit arrangement and the outer conductor load connection, and wherein the neutral conductor path further comprises a second galvanic disconnector.

5. The protective device according to claim 4, wherein the protective device further comprises at least a first snubber arrangement, and wherein the first snubber arrangement is arranged between the mechanical bypass switch and the outer conductor load connection.

6. The protective device according to claim 5, wherein the first snubber arrangement has at least a capacitor and at least a resistor, and the second voltage measuring device is connected in parallel to the capacitor.

7. The protective device according to claim 5, wherein the first snubber arrangement is arranged between the bypass mechanical switch and the first galvanic disconnector.

8. The protective device according to claim 3, wherein the voltage-detection-arrangement is configured to determine the voltage drop at the first voltage-dependent resistor by subtracting a second voltage measured by the second voltage measuring device from a first voltage measured by the first voltage measuring device.

9. The protective device according to according to claim 8, wherein the first voltage measuring device and the second voltage measuring device are connected to the control and driver unit, and wherein the subtraction of the second voltage from the first voltage is configured to be carried out by the control and driver unit.

10. The protective device according to claim 1, wherein the control and driver unit is configured to compare a temporal course of the voltage drop with at least one stored behavior of the voltage drop.

11. The protective device according to claim 10, wherein the switch on of the protective device is configured to be carried out if and only if the temporal course of the voltage drop fits within an expected value.

12. The protective device according to claim 11, wherein the expected value is within an expected range of the stored behavior of the voltage drop.

13. The protective device according to claim 10, wherein the switch on of the protective device is configured to be stopped based on the temporal course of the voltage drop not fitting within the expected value.

14. The protective device according to claim 13, the expected value is within the expected range of the stored behavior of the voltage drop.

15. The protective device according to claim 1, wherein the switch on of the protective device is configured to be carried out if and only if the measured temperature of the first voltage-dependent resistor is lower than a predefined temperature value.

16. The protective device according to claim 1, wherein the switch on of the protective device is configured to be stopped based on the measured temperature of the first voltage-dependent resistor being higher than a predefined temperature value.

17. The protective device according to claim 1, wherein the first voltage-dependent resistor is a varistor.

* * * * *